(12) United States Patent
Adams (10) Patent No.: US 9,068,840 B2
(45) Date of Patent: Jun. 30, 2015

(54) PITOT TUBE VELOCIMETER SYSTEM

(71) Applicant: Phillip M. Adams, Afton, WY (US)

(72) Inventor: Phillip M. Adams, Afton, WY (US)

( * ) Notice: Subject to any disclaimer, the term of this patent is extended or adjusted under 35 U.S.C. 154(b) by 169 days.

(21) Appl. No.: 13/676,203

(22) Filed: Nov. 14, 2012

(65) Prior Publication Data

US 2014/0130608 A1    May 15, 2014

(51) Int. Cl.
| | |
|---|---|
| *G01C 25/00* | (2006.01) |
| *G01F 1/46* | (2006.01) |
| *G01P 21/02* | (2006.01) |
| *G01P 3/26* | (2006.01) |
| *G01P 5/165* | (2006.01) |
| *G06F 3/0346* | (2013.01) |
| *G01P 5/16* | (2006.01) |

(52) U.S. Cl.
CPC ...... *G01C 25/00* (2013.01); *G01F 1/46* (2013.01); *G01P 5/165* (2013.01); *G06F 3/0346* (2013.01); *G01P 5/16* (2013.01); *G01P 21/025* (2013.01)

(58) Field of Classification Search
CPC .......... G01C 23/00; G01C 25/00; G01F 1/46; G01P 3/26; G01P 5/165; G01P 5/16; G01P 21/025; G06F 3/03; G06F 3/0346
USPC ........... 73/1.29; 702/85, 92–94, 96, 100, 104, 702/151, 155, 158
See application file for complete search history.

(56) References Cited

U.S. PATENT DOCUMENTS

| | | | | |
|---|---|---|---|---|
| 3,385,095 | A * | 5/1968 | De Leo et al. | 73/1.29 X |
| 3,548,632 | A * | 12/1970 | Fruit et al. | 73/1.29 X |
| 4,615,213 | A * | 10/1986 | Hagen | G01P 21/025 |
| 5,394,759 | A * | 3/1995 | Traina | G01F 1/46 |
| 5,440,217 | A * | 8/1995 | Traina | G01F 1/46 |
| 5,559,279 | A * | 9/1996 | Traina et al. | 73/1.29 |
| 6,205,376 | B1 * | 3/2001 | Gordon | 701/4 |
| 2005/0035242 | A1 * | 2/2005 | Nugent et al. | 244/175 |
| 2010/0062817 | A1 * | 3/2010 | Seydoux | 463/6 |
| 2012/0123704 | A1 * | 5/2012 | Golly et al. | G01P 5/165 |
| 2012/0191274 | A1 * | 7/2012 | Gomez Perez et al. | 701/18 |

FOREIGN PATENT DOCUMENTS

| | | | | | |
|---|---|---|---|---|---|
| GB | 409317 | A * | 4/1934 | | G01P 5/16 |
| JP | 63223569 | A * | 9/1988 | | 73/1.29 |
| RU | 2361198 | C1 * | 7/2009 | | G01N 27/87 |

* cited by examiner

*Primary Examiner* — Thomas P Noland
(74) *Attorney, Agent, or Firm* — Pate Baird, PLLC (57) ABSTRACT

An apparatus and method for sensing position according to flow velocity includes at least two pitot tubes each defining a central axis is along mutually orthogonal axes. Each of at least two pressure sensors is positioned in fluid communication with a corresponding one of the at least two pitot tubes. A controller receives outputs from the at least two pressure sensors and analyzes to determine at least one of an angular and translational velocity according to the outputs. A distance traveled is then determined according to the at least one of an angular and translational velocity. Corresponding methods of use and calibration are also disclosed.

20 Claims, 5 Drawing Sheets

PITOT TUBE VELOCIMETER SYSTEM

BACKGROUND

1. The Field of the Invention

This invention relates to navigation systems, and, more particularly, to relative-position navigation systems measuring distance and direction according to movement of a sensor.

2. The Background Art

The Global Positioning System (GPS) is the most common navigation system in use today. As known in the art, GPS relies on receiving signals from orbiting satellites to determine the position of a GPS receiver. This system has been very reliable and accurate and has therefore found many civilian and military applications.

However, there are situations where GPS is not operable. For example, GPS jammers can render GPS receivers useless. Likewise, within buildings, particularly fortified structures, signals may not be receivable. Within caves and underwater, GPS signals likewise cannot be received.

An alternative method, for position sensing is to use accelerometers as the basis for a Relative Positioning System (RPS). The acceleration outputs from the accelerometers can be integrated twice to determine a change in position. In general, accelerometers can be adequate. However, the accelerometers themselves may be sophisticated micro-electromechanical structures and can be expensive. The control circuits needed to interface with the accelerometers may also be subject to natural and man-made interference phenomena. It would be an advance in the art to provide an alternative relative positioning detection system.

The apparatus and methods disclosed herein provide a low cost and robust Velocimeter as a distance and direction determinant as an alternative to existing absolute positioning system or navigation systems.

BRIEF SUMMARY OF THE INVENTION

The invention has been developed in response to the present state of the art and, in particular, in response to the problems and needs in the art that have not yet been fully solved by currently available apparatus and methods. The features and advantages of the invention will become more fully apparent from the following description and appended claims, or may be learned by practice of the invention as set forth hereinafter.

Consistent with the foregoing, an apparatus for sensing position according to flow velocity is disclosed. The apparatus includes at least two pitot tubes each defining a central axis. For example, depending on how constrained a region of travel may be, the apparatus may have three pitot tubes, thus measuring effects of motion in three degrees of freedom. Systems may have more, such as six pitot tubes measuring in six degrees of freedom, and could have more. However, an apparatus in accordance with the invention may provide great utility while maintaining only three degrees of freedom. Thus, that example will be used herein. Nevertheless, it is to be understood that the apparatus may be embodied in two, three, or more degrees of freedom having the same corresponding number of pitot tubes for measuring velocity.

A first pitot tube is oriented having the central axis thereof parallel to a first direction. At least one other pitot tube is oriented having the central axis thereof extending along a second direction orthogonal to the first direction. In some embodiments a third pitot tube is oriented having the central axis thereof extending along a third direction orthogonal to both the first and second directions. Other pitot tubes may also be present with the central axis thereof being orthogonal, parallel, or at some other angle to any of the first, second and third directions.

Pressure sensors are each in fluid communication with a corresponding one of the pitot tubes. A controller is operably coupled to the pressure sensors and is programmed to receive outputs from the pressure sensors. The controller may determine at least one of an angular and translational velocity according to the outputs, and determine a distance traveled according to the at least one of the angular and translational velocity.

In one aspect of the invention, the pitot tubes are positioned within a shaped surface which may be spherical, cubical, or some other shape, and having distal ends thereof in fluid communication with space exterior to the shaped surface.

In another aspect of the invention, the shaped surface defines at least one vent and the sensors are differential pressure sensors each positioned to measure a difference between a pressure within the shaped surface and a pressure within one of the at least three pitot tubes. The shaped (e.g., spherical, rectangular, etc.) surface may be perforated to act as a hydrodynamic surface, yet allow passage of fluids.

In another aspect of the invention, a transmitter is operably coupled to the pressure sensors and a receiver is within a communication range of the transmitter. The controller is operably coupled to the receiver.

A corresponding method for use and calibration are also disclosed and claimed herein.

BRIEF DESCRIPTION OF THE DRAWINGS

The foregoing features of the present invention will become more fully apparent from the following description and appended claims, taken in conjunction with the accompanying drawings. Understanding that these drawings depict only typical embodiments of the invention and are, therefore, not to be considered limiting of its scope, the invention will be described with additional specificity and detail through use of the accompanying drawings in which:

DETAILED DESCRIPTION OF THE PREFERRED EMBODIMENTS

It will be readily understood that the components of the present invention, as generally described and illustrated in the drawings herein, could be arranged and designed in a wide variety of different configurations. Thus, the following more detailed description of the embodiments of the system and method of the present invention, as represented in the drawings, is not intended to limit the scope of the invention, as claimed, but is merely representative of various embodiments of the invention. The illustrated embodiments of the invention will be best understood by reference to the drawings, wherein like parts are designated by like numerals throughout.

Figure 1A:
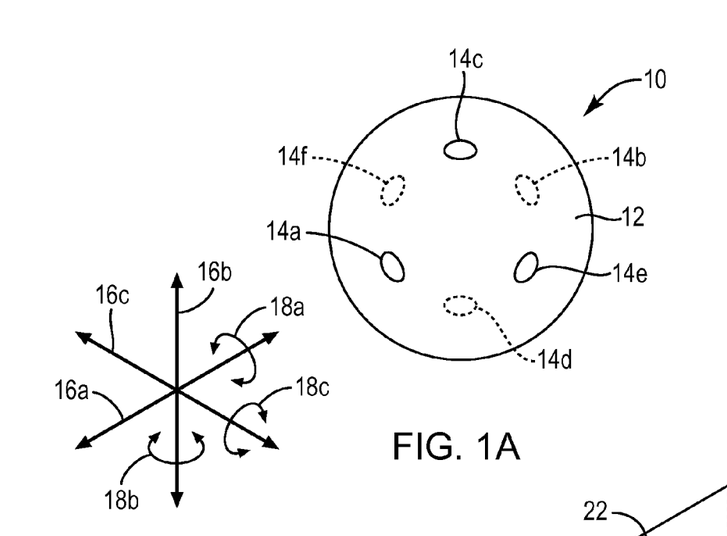
FIG. 1A is an isometric view of a sensor system in accordance with an embodiment of an apparatus in accordance with the present invention.

FIG. 1A illustrates a sensor system 10 for measuring distance according to fluid flow velocity. The sensor system 10 may include a spherical surface 12 that is substantially hollow or substantially occupied (filled) with material. The spherical surface 12 defines apertures 14a-14f.

In the illustrated embodiment there are six apertures distributed equally around the spherical surface. The distribution of the apertures 14a-14f may correspond to three mutually orthogonal axes 16a-16b. For example, an aperture 14a and an opposing aperture 14b may lie on an axis 16a, apertures 14c and opposing aperture 14d may lie on an axis 16b, and apertures 14e and 14f may lie on an axis 16c.

In some embodiments, a line extending between an aperture 14a-14f and an opposing aperture 14a-14f extends along one of the three mutually orthogonal axes. Each of the three mutually orthogonal axes 16a-16c has at least one pair of apertures defining a line extending along that axis. Rotational directions 18a-18c may also be defined as rotation about the axes 16a-16c, respectively.

In some embodiments, less than six apertures are used. In such embodiments, each of the apertures 14a-14f that remains may define a line relative to the center of the sphere that has an extent along one of the mutually orthogonal axes 16a-16c. Each of the mutually orthogonal axes 16a-16c has at least one line extending therealong.

Figure 1B:
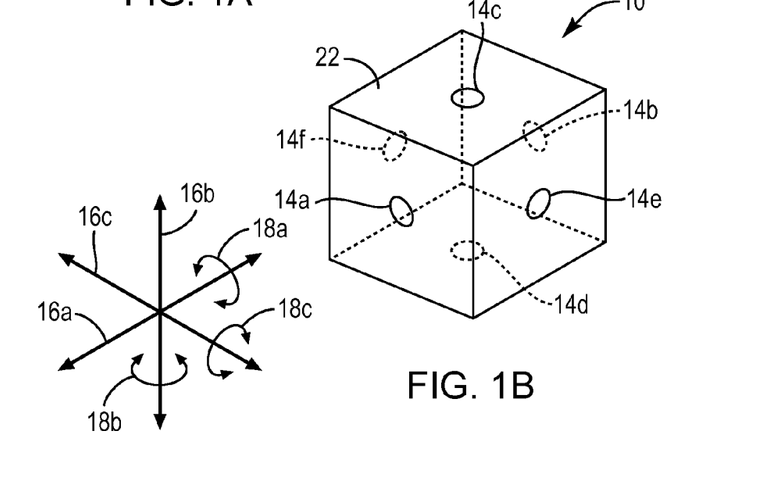
FIG. 1B is an isometric view of an alternative sensor system in accordance with an embodiment of an apparatus in accordance with the present invention.

FIG. 1B illustrates an alternative embodiment wherein the apertures 14a-14f are formed in faces 20 of a cubical surface 22. Other shapes may also be used to define surfaces in which apertures 14a-14f are formed.

Figure 1C:
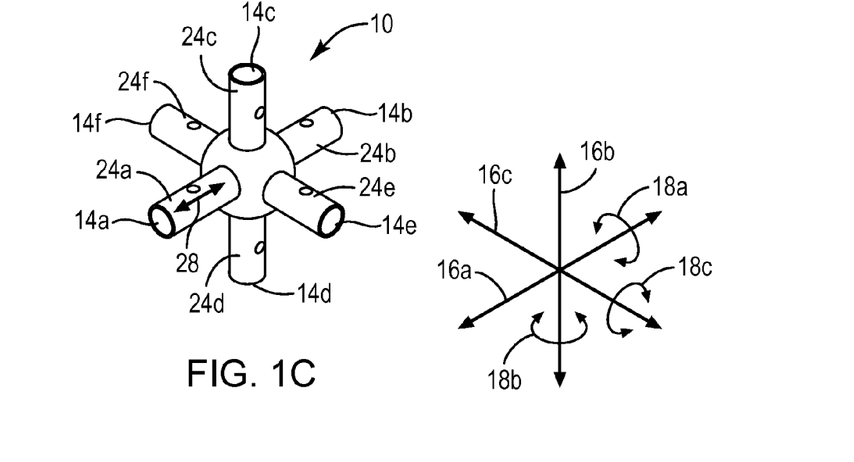
FIG. 1C is an isometric view of an alternative sensor system in accordance with an embodiment of an apparatus in accordance with the present invention.

FIG. 1C illustrates an alternative embodiment in which apertures 14a-14f are defined at the distal ends of pitot tubes 24a-24f. For each of the mutually orthogonal axes 16a-16c, one of the pitot tubes 24a-24f has a central axis extending therealong or substantially parallel thereto. Proximal ends of the pitot tubes 24a-24f may connect to a mounting structure 26, which may be spherical, cubical, or some other shape. The pitot tubes 24a-24f may have an extent 28 beyond the outer surface of the mounting structure 26. The extent 28 may be selected such that flow over the distal ends of the pitot tubes 24a-24f tends to reduce interference of the mounting structure 26 on flows over the distal ends.

Figure 2A:
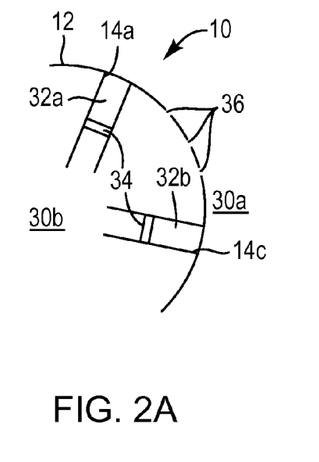
FIG. 2A is a cross-sectional view of a sensor system in accordance with an embodiment of an apparatus in accordance with the present invention.

FIG. 2A illustrates structures interior to the spherical surface 12. Although the spherical surface 12 is shown, similar structures may also be located within the cubical surface 22, mounting structure 26, or surface of some other shape. In the following description, reference to the spherical surface 12 is used by way of example only. It includes and may be replaced with reference to the surfaces of other embodiments disclosed herein.

The spherical surface 12 defines an exterior space 30a and an interior space 30b. Fluid flow, due to movement of the sensor system 10 relative to surrounding fluid (i.e. liquid or gas), occurs in the exterior space 30a and induces a pressure change within three or more channels. Only two of the channels 32a, 32b are shown in FIG. 2A. However, each of several channels may have identical configuration. In the embodiment of FIG. 1C, the channels may be defined by the pitot tubes 24a-24f.

Each channel 32a-32b is in fluid communication with a corresponding one of the apertures 14a-14f. In some embodiments, the apertures 14a-14f and corresponding channels are formed in a single drilling or molding operation.

A pressure sensor 34 is positioned either within the channel 32a-32b or in fluid communication therewith. In some embodiments, the pressure sensor 34, the structure to which it is mounted, or both may prevent any fluid flow through the channel 32a-32b, other than that permitted by deflection of the pressure sensor 34, the structure, or both to which it is mounted and that small amount of flow due to compression of fluid within the channel upstream from the pressure sensor 34.

The pressure sensor 34 may be embodied as any pressure sensor known in the art. In particular, the pressure sensor 34 may be a differential pressure sensor oriented to measure the difference between the pressure within the channel 32a-32b and the pressure within the interior space 30b.

The pressure within the interior space 30b is preferably substantially equal to the pressure of undisturbed fluid surrounding the spherical surface 12, or surface of some other shape. Equalization of the pressure in the interior space 30b may be accomplished by means of one or more vent apertures 36. The vent apertures 36 may advantageously be positioned as far as possible from the apertures 14a-14f in order to reduce interference with fluid flow thereover.

In some embodiments, the vent apertures 36 may be an array of apertures 36 such as might result from a surface formed by a screen, mesh or other perforated sheet of material. In such embodiments, the aperture size and distribution may be selected to reduce interference with flow over the apertures 14a-14f. The size and distribution of the apertures 36 may also be chosen such that equalization with an ambient pressure is permitted without allowing significant fluid flow through the interior space responsive to movement of the sensor system 10.

Figure 2B:
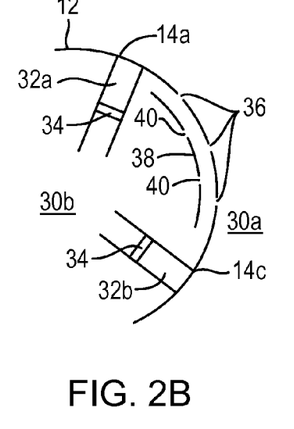
FIG. 2B is a cross-sectional view of an alternative embodiment of a sensor system in accordance with an embodiment of an apparatus in accordance with the present invention.

Referring to FIG. 2B, in some embodiments, a baffle 38, that itself may be perforated with one or more apertures 40, may be positioned within the interior space 30b to prevent fluid flow in an area where a reference pressure is measured. the baffle 38 may define a surface conforming to and offset from the outer surface of the sensor system 10, such as the spherical surface 12, cubic surface 22, or surface of the mounting structure 26.

In such embodiments, the pressure sensor 34 is preferably in fluid communication with an area inward of the baffle 38 in order to measure a reference pressure for comparison with the pressure within the channels 32a-32b. This may include extension of the channels 32a-32b from the apertures 14a-14f to a location up to or beyond the baffle 38 with the pressure sensor 34 positioned within the channels 32a-32b.

Figure 2C:
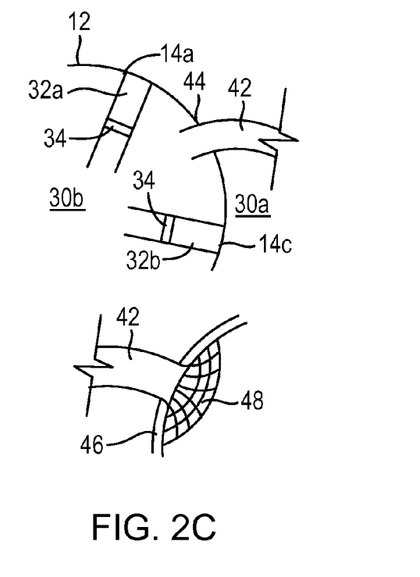
FIG. 2C is a cross-sectional view of an alternative embodiment of a sensor system in accordance with an embodiment of an apparatus in accordance with the present invention.

Referring to FIG. 2C, in some embodiments, equalization may be accomplished by a tube 42 in fluid communication with the interior space 30b. This may be through an aperture 44 formed in the spherical surface 12, or other surface as in the other disclosed embodiments. The tube 42 may be connected to a volume that is likely to be equal in pressure to the undisturbed pressure of fluid around the sensor system 10.

For example, in some embodiments, the tube 42 may connect to a diver's wet suit 46 and be in fluid communication with the fluid 48 within the diver's wet suit 46. The tube 42 may connect to a cage 48 or other perforated structure. This will insulate the inlet of the tube 42 from transitory flows due to diver movement and maintain the inlet of the tube unobstructed in the event that the diver presses against the wet suit 46.

Figure 2D:
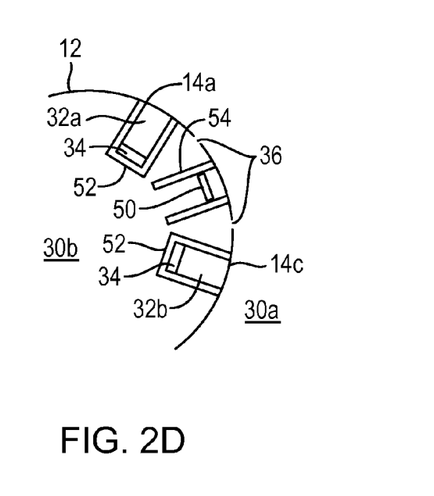
FIG. 2D is a cross-sectional view of an alternative embodiment of a sensor system in accordance with an embodiment of an apparatus in accordance with the present invention.

Referring to FIG. 2D, in another embodiment, one or more reference pressure sensors 50 may be positioned within the interior space 30b and measure the pressure of the fluid therein. In such embodiments, the pressure sensor 34 and pressure sensor 50 may be embodied as absolute pressure sensors rather than differential pressure sensors. In such embodiments, a stiff, rigid, backing material 52 may be interposed between the interior space 30b and the pressure sensor 34 to reduce interference. For example, this resists the pressure in the interior space 30b from influencing the reading of the pressure sensor 34. A baffle 54, such as a square or cylindrical tube, may surround or otherwise shield the reference pressure sensor 50 from movements of fluid within the interior space 30b.

Figure 2E:
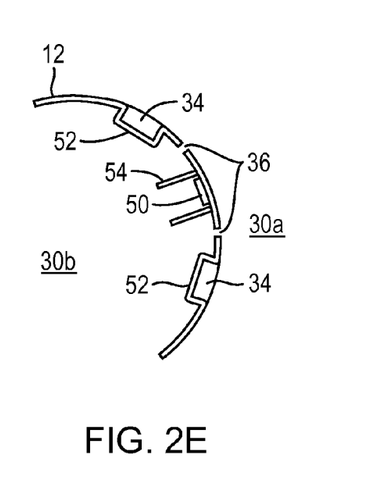
FIG. 2E is a cross-sectional view of an alternative embodiment of a sensor system in accordance with an embodiment of an apparatus in accordance with of the present invention.

Referring to FIG. 2E, in an alternative approach, the pressure sensor may be positioned flush with the spherical surface 12, or surface of other-shaped embodiments. In such embodiments the channels 32a-32b may be omitted.

Figure 3:
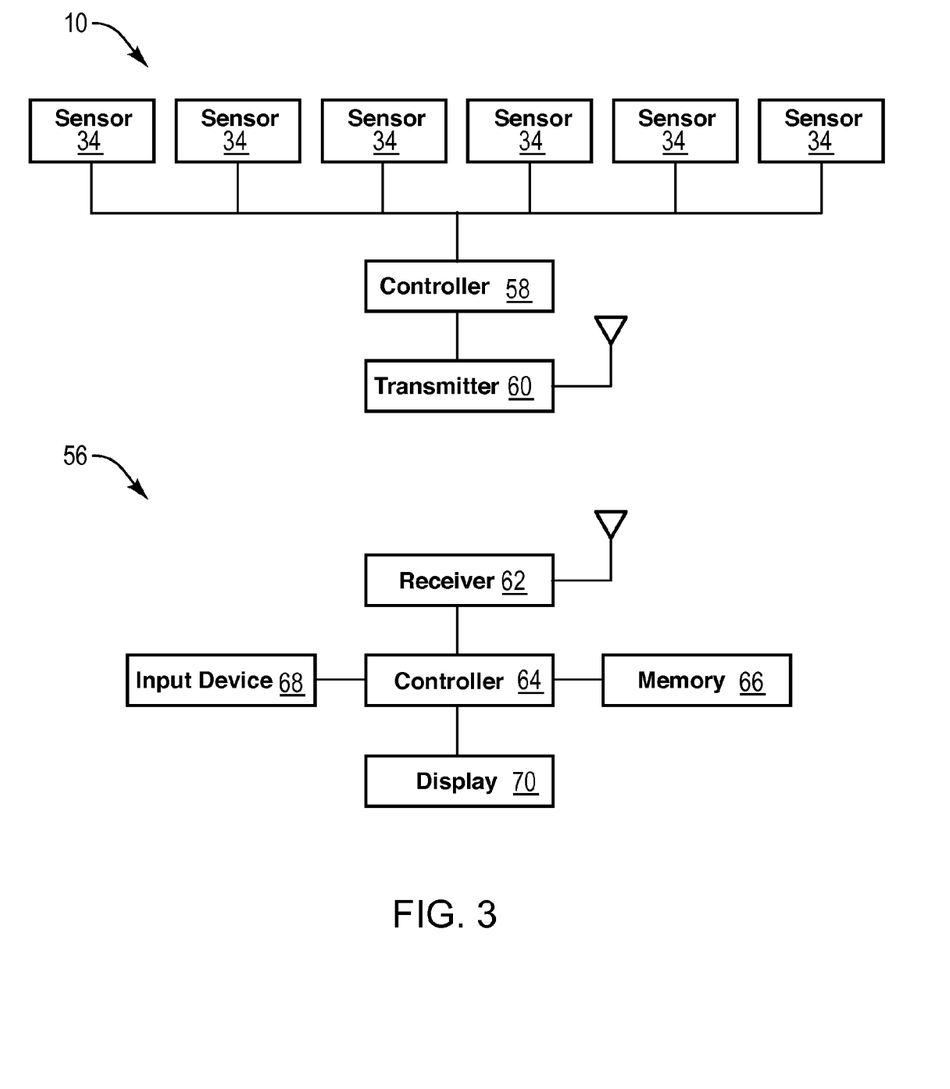
FIG. 3 is a schematic block diagram of a position sensing system in accordance with an embodiment of an apparatus in accordance with the present invention.

FIG. 3 illustrates a position sensing system 56 incorporating a sensor system 10 according to one or more of the foregoing embodiments. The pressure sensors 34 may be operably coupled to a controller 58 operable to sample or otherwise process the outputs thereof. The reference sensor 50 may also be operably coupled to the controller 58 in embodiments incorporating such a sensor.

The controller 58 may be operably coupled to a transmitter 60 operable to communicate with a corresponding receiver 62. In such embodiments, the controller 58 may be operable to format and otherwise prepare outputs of the pressure sensors for transmission using the transmitter 60.

The receiver 62 is operably coupled to a controller 64. The controller 64 may be operable to process outputs of the receiver. It may analyze, calibrate, and otherwise interpret them to convert pressure information to velocity information. It may integrate or differentiate to convert velocity information to distance, orientation, both, or other spatial information. In some embodiments, pressure sensors 34, 50 may connect directly, wirelessly or by wires, to the controller 64 such that the controller 58 is omitted.

The controller 64 may additionally be coupled to a memory device 66 for storing operational data and intermediate or final results of processing, an input device 68 for receiving user inputs, and a display 70 for presenting the result of calculations. The controllers 58, 64 may be embodied as an application specific integrated circuit (ASIC) or general purpose processor.

Figure 4A:
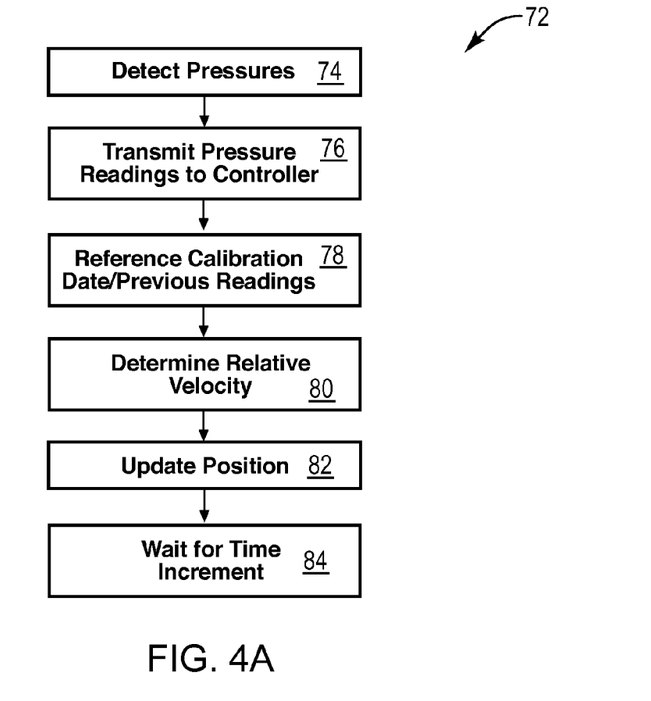
FIG. 4A is a process flow diagram of a method for sensing change in position in accordance with an embodiment a method in accordance with of the present invention.

FIG. 4A illustrates a method 72 for determining a change in position according to measurements of pressure, such as using the position sensing system 56. The method 72 includes detecting 74 pressure, such as using the sensor system 10. The pressure readings may then be transmitted 78 to a processor, such as the controller 64. The pressure readings may then be evaluated 76 relative to calibration data for the sensor system 10 to determine 80 a likely translational and/or angular velocity. The position of the sensor system 10 may then be updated 82. This may occur by multiplying the translational velocity, angular velocity, or both by a time increment to determine a translational displacement, rotational displacement, or both. The method 72 may then include waiting for an elapsed time increment and then repeating the process upon receipt of a next pressure measurement. The time increment may be chosen to be identical to, or a multiple of, a sample rate of a component reading the outputs of the pressure sensors 34, 40.

Mathematically, the velocity of flow over a pitot tube can be calculated according to equation (1), where $P_t$ is the stagnation or total pressure of the fluid within the channel 32a-32b or at the surface of the spherical surface 12, or other-shaped surface, $P_s$ is the static (e.g. ambient) pressure, such as may be measured in the interior space 30b, and ρ is the density of the fluid. Where the pressure sensor 34 is a differential pressure sensor the term $(P_t-P_s)$ may be replaced by ΔP, which is the pressure differential measured by the sensor.

$$V = \sqrt{\frac{2(P_t - P_s)}{\rho}} \qquad (1)$$

In some embodiments, equation (1) is used to determine 80 an initial guess or estimate that is then corrected according to calibration data. In some embodiments, equation (1) is used outright without the benefit of calibration data. In still other embodiments, equation (1) is used to determine a starting point in a constellation of calibration point in an algorithm for determining a likely value of one or both of translational and angular velocity.

Figure 4B:
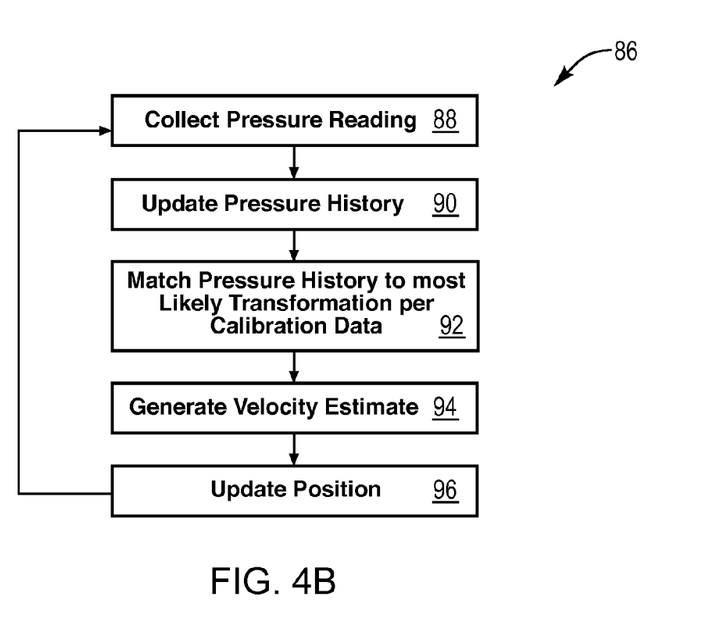
FIG. 4B is a process flow diagram of an alternative method for sensing change in position in accordance with an embodiment a method in accordance with of the present invention.

FIG. 4B illustrates a method 86 for generating an estimate of one or both of position and velocity using pressure readings, such as pressure readings from a sensor system 10. The method 86 may include collecting 88 pressure readings, such as from the sensor system 10. The pressure reading history may be updated 90. The pressure reading history may record the last number N of pressure readings from the sensor system 10. The number N of readings stored N may be any arbitrary number that will provide a suitable sample and stability. For example, N may be a number from three to about twenty or more in a period of less than a second. It may be more or less. The pressure readings in the pressure reading history may then be analyzed and a most likely transformation may be determined 92. For example, a least squares or Kalman method may be used. Any method known in the art to map readings to a likely transformation may be used. In practice, pressure readings from different calibration points may be close to one another or equal. Noise and inaccuracies may also cause confusion as to which calibration point or points correspond to measured values from the sensor system 10.

Accordingly, using the assumption that velocity and orientation do not change instantaneously, a series of consecutive readings may be analyzed with respect to contiguous groups of calibration points to determine 92 a most likely transformation. A Viterbi algorithm as known in the art may be used to determine a likely transformation undergone by the sensor system 10 for a given set of consecutive pressure readings. An estimate of angular velocity, translational velocity, or both may then be generated 94 for the most recent pressure readings. A position and orientation estimate of the sensor system 10 may then be updated 96 according to the velocity estimate, such as by multiplying the velocity estimates by a time increment and adding to the previous position. Various "numerical methods" exist for curve-fitting, predicting, smoothing and so forth.

Figure 5:
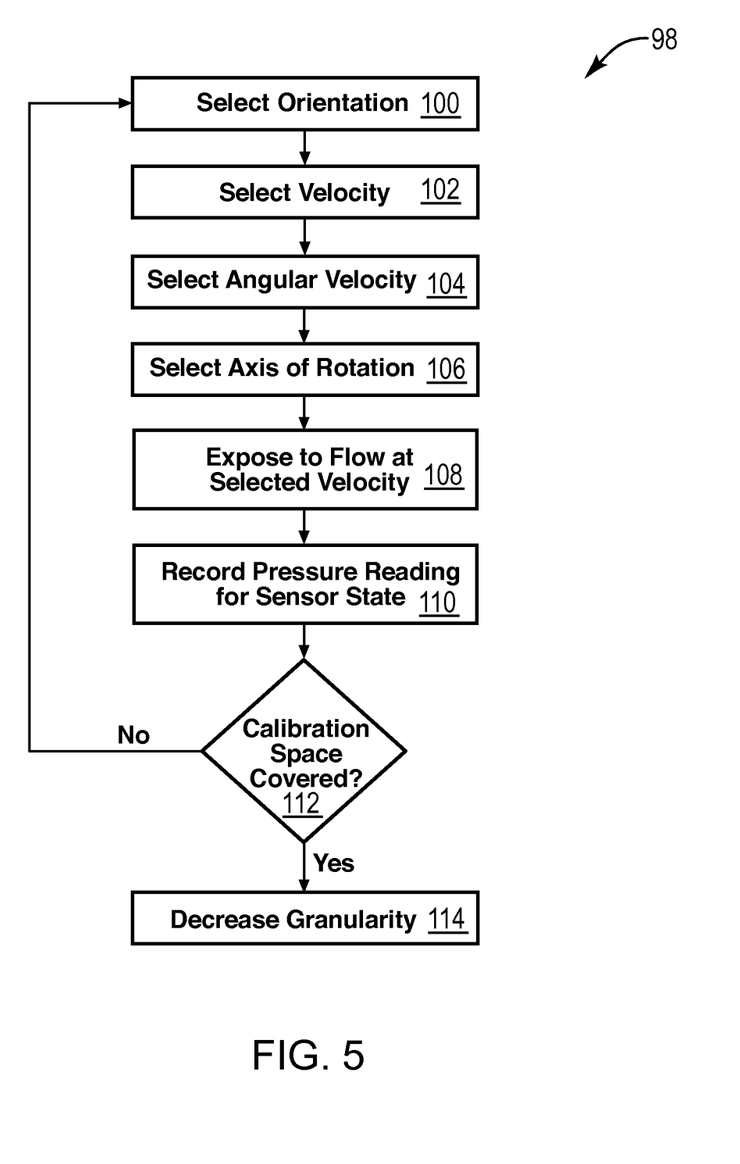
FIG. 5 is a process flow diagram of a method for calibrating a sensor system in accordance with an embodiment of a method in accordance with of the present invention.

FIG. 5 illustrates a method 98 for calibrating a sensor system 10. The method 98 may include selecting a sensor state. This may include selecting 100 an orientation, selecting 102 a translational flow velocity, selecting 104 an angular velocity, and selecting 106 an axis of rotation. Selecting 100 an orientation may include selecting θ and Φ values in a spherical coordinate system. Likewise, selecting 106 an axis of rotation may include selecting θ and Φ angular values. In some embodiments, calibration may also be performed for various pressures, inasmuch as the pressure of fluid influences the density (see equation (1)) above and therefore may influence the relationship between pressure readings and velocity, particularly for compressible fluids.

The sensor system 10 may then be exposed 108 to fluid flow at the selected velocity while undergoing rotation at the selected angular velocity about the selected axis of rotation. The output of the sensor system 10 may then be recorded 110 for the selected sensor state. The values defining the sensor state may be recorded with the sensor output. If the calibration state is not found 112 to be covered, then another calibration state is selected and the method 98 repeats.

If the calibration space is found 112 (e.g. calculated, analyzed) to be covered by the previously recorded pressure readings, then the method 98 may include additional steps to decrease 114 the sensitivity (e.g. precision, resolution, increment) of the calibration space. Decreasing the sensitivity of the calibration space may include generating interpolated calibration points based on actual calibration data or generating a numerical methods curve fit of the calibration data. For example, the least squares method, Kalman method, or some other method may be used to increase the sensitivity of the calibration space.

The present invention may be embodied in other specific forms without departing from its spirit or essential characteristics. The described embodiments are to be considered in all respects only as illustrative, and not restrictive. The scope of the invention is, therefore, indicated by the appended claims, rather than by the foregoing description. All changes which come within the meaning and range of equivalency of the claims are to be embraced within their scope.

What is claimed and desired to be secured by United States Letters Patent is:

1. A method for estimating movement comprising:
   moving a sensor system through a fluid, the sensor system including at least two pitot tubes having central axes thereof orthogonal to one another, the sensor system further including at least two pressure sensors each positioned in fluid communication with one of the at two pitot tubes;
   receiving pressure readings from the at least two pressure sensors;
   translating the pressure readings to velocity estimates;
   translating the velocity readings to displacement estimates.

2. The method of claim 1, wherein translating the pressure readings to velocity readings comprises:
   identifying calibration data corresponding to the pressure readings from a calibration data space; and
   calculating the velocity estimates according to the identified calibration data.

3. The method of claim 2, wherein the calibration space relates pressure readings to velocity of the sensor system relative to surrounding fluid.

4. The method of claim 3, wherein the calibration space relates pressure readings to one or more of axis of rotation and orientation of the sensor system.

5. The method of claim 1, wherein the at least two pitot tubes are positioned within a shaped surface having distal ends thereof in fluid communication with space exterior to the shaped surface.

6. The method of claim 5, wherein the shaped surface defines at least one vent.

7. The method of claim 6, wherein the at least two pressure sensors are differential pressure sensors each position to measure a difference between a pressure within the shaped surface and a pressure within one of the at least two pitot tubes.

8. The method of claim 6, wherein the shaped surface is perforated.

9. A method for calibrating a sensor system comprising:
   selecting a sensor system including at least two pitot tubes each defining a central axis, the central axis of the at least two pitot tubes being orthogonal to one another, the sensor system further including at least two pressure sensors each positioned in fluid communication with one of the at two pitot tubes; and
   selecting a plurality of calibration states
   for each calibration state of the plurality of calibration states
      placing the sensor system in the calibration state; the sensor system including at least two pitot tubes each defining a central axis, the central axis of the at least two pitot tubes being orthogonal to one another, the sensor system further including at least two pressure sensors each positioned in fluid communication with one of the at two pitot tubes; and
      recording readings from the at least two pressure sensors in association with the calibration state.

10. The method of claim 9, wherein the each calibration state includes a translational fluid velocity.

11. The method of claim 10, wherein the each calibration state includes an angular velocity of the sensor system.

12. The method of claim 11, wherein the each calibration state includes an orientation of the sensor system relative to translational fluid flow.

13. The method of claim 12, wherein:
   the each calibration state includes an axis of rotation of the sensor system; and
   the at least two pitot tubes are positioned within a shaped surface having distal ends thereof in fluid communication with space exterior to the shaped surface.

14. A computerized method for determining position according to flow velocity of a fluid, the method comprising:
   providing at least two pitot tubes each defining a central axis, including at least one pitot tube oriented with the central axis thereof parallel to a first direction, at least one pitot tube oriented having the central axis thereof having an extent along a second direction orthogonal to the first direction;
   providing at least two pressure sensors each positioned in fluid communication with one of the at least two pitot tubes;
   providing a processor operably connected to the at least two pressure sensors
   moving the at least two pitot tubes through a fluid;
   receiving, by the processor, first signals reflecting pressure readings corresponding to the at least two pressure sensors;
   processing, by the processor the pressure readings to calculate velocity estimates; and calculating, by the processor, based on the velocity estimates, displacement estimates.

15. The method of claim 14, further comprising:
receiving by a controller, comprising the processor, outputs from the at least two pressure sensors.

16. The method of claim 14, wherein:
the at least two pitot tubes are each positioned within a shaped surface; and
each of the at least two pitot tubes has a corresponding distal end in fluid communication with space exterior to the shaped surface.

17. The method of claim 16, wherein the shaped surface defines at least one vent.

18. The method of claim 17, wherein:
the at least two pressure sensors are differential pressure sensors;
each of the at least two pressure sensors is operably connected to measure a difference between a pressure within the shaped surface and a pressure within a corresponding one of the at least two pitot tubes.

19. The method of claim 18, wherein the shaped surface is perforated.

20. The method of claim 14, further comprising:
providing a transmitter operably connected to the processor;
providing a receiver within a communication range of the transmitter and operably connected to exchange information therewith; and
transmitting, by the transmitter to the receiver information reflecting a distance reflecting the displacement estimate.

* * * * *